(12) United States Patent
Hodges (10) Patent No.: US 11,879,438 B2
(45) Date of Patent: *Jan. 23, 2024

(54) MODIFIED WYE RING

(71) Applicant: Christopher Hodges, Brighton, CO (US)

(72) Inventor: Christopher Hodges, Brighton, CO (US)

(*) Notice: Subject to any disclaimer, the term of this patent is extended or adjusted under 35 U.S.C. 154(b) by 684 days.

This patent is subject to a terminal disclaimer.

(21) Appl. No.: 17/095,305

(22) Filed: Nov. 11, 2020

(65) Prior Publication Data

US 2021/0071648 A1  Mar. 11, 2021

Related U.S. Application Data

(60) Continuation of application No. 17/028,033, filed on Sep. 22, 2020, now Pat. No. 10,871,152, which is a division of application No. 16/040,625, filed on Jul. 20, 2018, now Pat. No. 10,823,154.

(60) Provisional application No. 62/541,303, filed on Aug. 4, 2017.

(51) Int. Cl.
| | |
|---|---|
| *F03D 80/50* | (2016.01) |
| *H02K 3/38* | (2006.01) |
| *H02K 3/50* | (2006.01) |
| *H02K 7/18* | (2006.01) |
| *H02K 15/00* | (2006.01) |
| *F03D 9/25* | (2016.01) |

(52) U.S. Cl.
CPC .............. *F03D 80/50* (2016.05); *F03D 9/25* (2016.05); *H02K 3/38* (2013.01); *H02K 3/50* (2013.01); *H02K 7/1838* (2013.01); *H02K 15/0006* (2013.01); *H02K 2203/09* (2013.01)

(58) Field of Classification Search
CPC .......... F03D 80/50; F03D 80/507; F03D 9/20; F03D 9/25; F03D 15/205; F03D 15/207; F05B 2230/80; H02K 3/32; H02K 3/38; H02K 3/46; H02K 3/50; H02K 3/505; H02K 3/51; H02K 7/183; H02K 7/1838; H02K 7/18; H02K 15/0006; H02K 15/00; H02K 2203/09

See application file for complete search history.

(56) References Cited

U.S. PATENT DOCUMENTS

| | | | |
|---|---|---|---|
| 7,863,787 B2 * | 1/2011 | Lafontaine | H02K 9/06 310/71 |
| 9,083,220 B2 * | 7/2015 | Neumann | H02K 15/0006 |
| 9,093,886 B2 * | 7/2015 | Neumann | G01M 1/28 |
| 9,143,022 B2 * | 9/2015 | Neumann | H02K 15/0006 |
| 9,334,850 B2 * | 5/2016 | Neumann | F03D 80/50 |
| 9,411,017 B2 * | 8/2016 | Moldenhauer | F03D 17/00 |
| 10,038,357 B2 * | 7/2018 | Neumann | H02K 15/0006 |

(Continued)

*Primary Examiner* — Edgardo San Martin
(74) *Attorney, Agent, or Firm* — Leyendecker & Lemire LLC (57) ABSTRACT

Methods for replacing a Wye-ring of a wind turbine generator preferably, but not necessarily, in-situ are described along with a combination of three arcuate Wye-ring sections that when assembled comprise a Wye-ring. The method after gaining access to the Wye-ring typically comprises: removing all or most of the damaged Wye-ring; installing the replacement sections typically by welding or brazing them in place; insulating the new ring; installing new blocking; and adhesively securing the new blocking in place.

15 Claims, 8 Drawing Sheets

(56) References Cited

U.S. PATENT DOCUMENTS

| | | | | |
|---|---|---|---|---|
| 10,107,256 B2* | 10/2018 | Neumann | ............ | H02K 15/165 |
| 10,256,705 B2* | 4/2019 | Sørensen | ............... | H02K 15/00 |
| 10,476,356 B2* | 11/2019 | Toledo | ................ | H02K 7/1838 |
| 10,823,154 B2* | 11/2020 | Hodges | ............. | H02K 15/0006 |
| 10,871,152 B1* | 12/2020 | Hodges | ................... | H02K 3/50 |
| 2007/0188030 A1* | 8/2007 | Drubel | .................. | H02K 3/522 |
| | | | | 310/71 |
| 2022/0302802 A1* | 9/2022 | de Swardt | ............. | H02K 1/185 |

* cited by examiner

MODIFIED WYE RING

RELATED APPLICATIONS

This continuation application incorporates by reference in its entirety and claims priority to U.S. divisional patent application Ser. No. 17/028,033 ("divisional application") filed on Sep. 22, 2020. The divisional patent application further claimed priority to U.S. patent application Ser. No. 16/040,625 ("parent application") filed on Jul. 20, 2018. The parent application was derived from and claimed priority to U.S. provisional application 62/541,303 filed on Aug. 4, 2017. All three applications having the same title and inventor as the present application.

BACKGROUND

Wind turbines that convert wind into mechanical rotation through its blades and then convert the mechanical rotation into electric power for distribution on an electrical grid are well known. To convert the mechanical rotation into electricity a doubly fed induction generator (DFIG) is often used. These generators typically have a conductive Wye ring most often comprised of copper that is coupled to the generator's coils at three locations on the non-drive end thereof. The Wye rings serves as a floating ground for all three phases of current generation.

Due to the regular and continuous rotation of the generator and the stresses associated with this rotation, it is not uncommon for the ring to fatigue and form a discontinuity in the form of a crack at various locations of stress concentration and/or ring weakness. While the ring maintains an electrical connection with all three windings if there is a single discontinuity, in most cases a second discontinuity will disconnect at least one winding from the floating neutral. Arcing across the discontinuities can degrade the insulation adjacent thereto and eventually cause a cross arcing condition, which is sensed by the turbines control system which then winds the turbine down.

Traditionally to repair a Wye-ring, the entire generator must be removed from the turbine tower. This is a time consuming, costly and demanding task. First the turbine must be disconnected from its mountings and separated from the gear box and the turbine rotors. The nacelle housing must be removed to gain access and the turbine lifted by crane or helicopter from the tower and lowered to the ground. On the ground the end of the turbine must be disassembled to permit the damaged ring to be removed and also permit a new ring to be moved into place and mounted. Once the new ring has been secured in place, the generator must be reassembled as necessary, hoisted to its position on top of the tower, and remounted. The procuring and leasing of a crane and a crane operator alone can be extremely expensive not to mention the potentially long down time associated not only with the repair but with scheduling the crane.

This application incorporates U.S. Pat. Nos. 9,143,022 and 9,411,017 by reference for their description of prior Wye rings and the use of prior art Wye rings in electric generators.

DETAILED DESCRIPTION

Embodiments of the present invention comprise methods for replacing a Wye-ring of a wind turbine generator preferably, but not necessarily, in-situ. The method after gaining access to the Wye-ring typically comprises removing all or part of the damaged Wye-ring; cleaning the attachment locations for the connecting the replacement ring sections; installing the replacement sections by welding or brazing them in place; insulating the new ring, installing new blocking; and adhesively securing the new blocking in place. Finally, the rotor fan and housing is reinstalled and the generator is reconnected within the nacelle of the turbine and readied for use.

Several variations of the replacement Wye-ring can be utilized depending on the nature of the repair and the turbine's operator/owner. In two versions the three rings section each comprise a single arcuate copper ribbon. The ends of one comprises relatively short radially extending arms that facilitate attachment to the cup arm of the removed Wye-ring, which can be left in place. The ends of the other comprise longer radially extending arms that fully replace the cup arms of the removed Wye-ring. In yet other variations having ends with either the short or long radial extending arms, the single piece of copper ribbon is replaced with two or more thinner pieces of arcuate ribbon that are brazed, welded or otherwise joined together at the short or long radial arms.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A Wind Turbine

Figure 1:
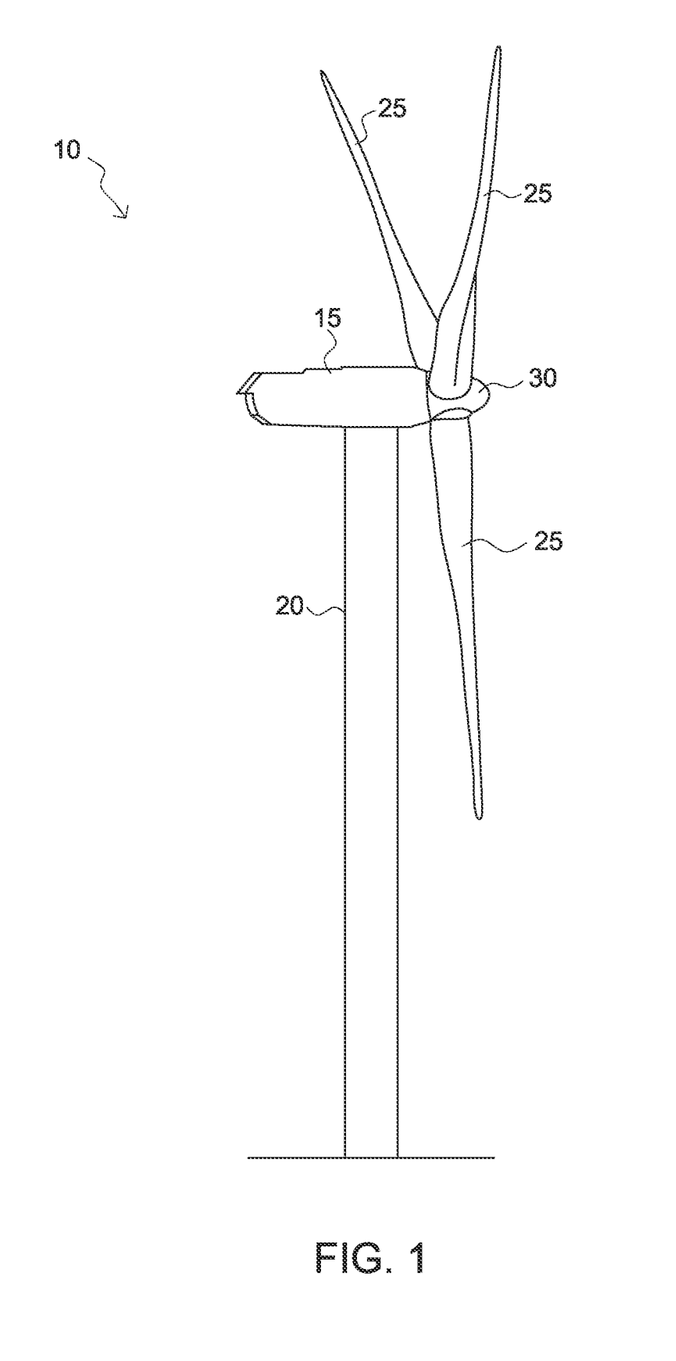
FIG. 1 is a perspective view of a typical wind turbine as is known in the prior art.

FIG. 1 is an illustration of a typical wind generator on which embodiments of the Wye-ring replacement method may be applied. It is appreciated that the Wye-ring replacement method can be used on turbines of different construction and configuration and that the turbine illustrated is merely an example.

As shown, the wind turbine 10 comprises a tower 20 that can rise a substantial distance off of a support structure on the ground. A support structure (not shown) is attached to the top of the tower on which a generator assembly (not shown) is mounted. The generator assembly typically includes a generator and a transmission. The generator assembly is enclosed in nacelle 15. Adjacent to one end of the nacelle a hub 30 is provided from which a plurality of rotor blades 25 are attached and extend outwardly therefrom. The hub further includes a rotor shaft 35 (see FIG. 2) that extends inwardly to and is operatively coupled with the generator assembly 40.

When in operation, terrestrial wind impacts the rotor blades 25 and imparts a torque on the rotor shaft 35 which in turn causes the rotation of the coil windings in the generator. The rotating windings within the generator housing creates a three phase electrical current which is directed out of the turbine and into an electrical grid by way of electrical cables that travel downwardly through the interior of the tower.

Figure 2:
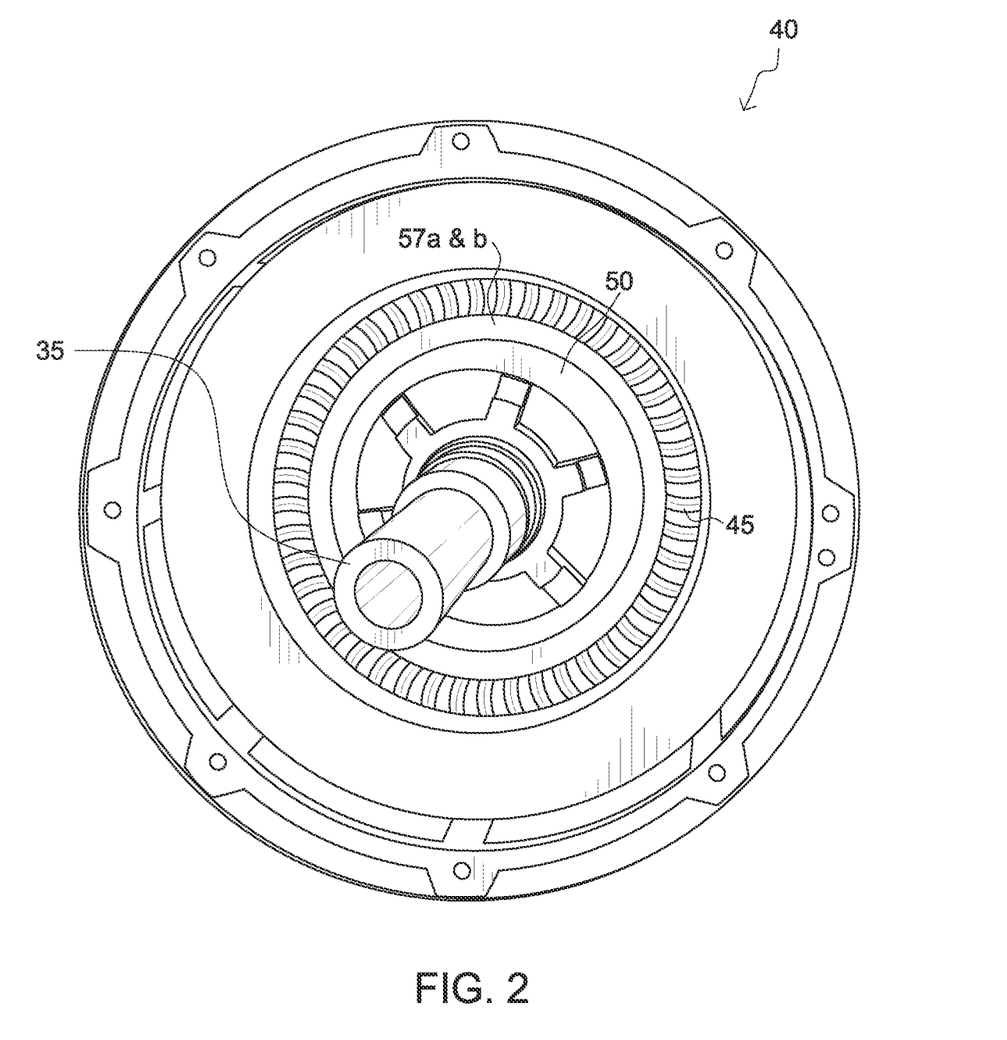
FIG. 2 is a perspective view of the non-drive side end of a generator used in the typical wind turbine of FIG. 1 with the rotor fan removed therefrom illustrating the Wye-ring as is known in the prior art.

FIG. 2 is a partial illustration of the non-drive side of the generator 40 with the bearing shield, various slip rings, a slip ring housing and a rotor fan removed to reveal the rotor's end windings 45 and a Wye-ring 50 circumscribing a rotor shaft with the Wye-ring fitted inside of the windings separated from the windings by insulating blocking 57. The Wye-ring itself may also be wrapped in an insulating material. The Wye-ring is attached to the windings though radially extending arms referred to as cup arms although these are not seen in FIG. 2. The cup arms extend through the blocking at three locations and attach to the windings. The Wye-ring provides a floating neutral connection for the three phase generator windings.

Figure 3:
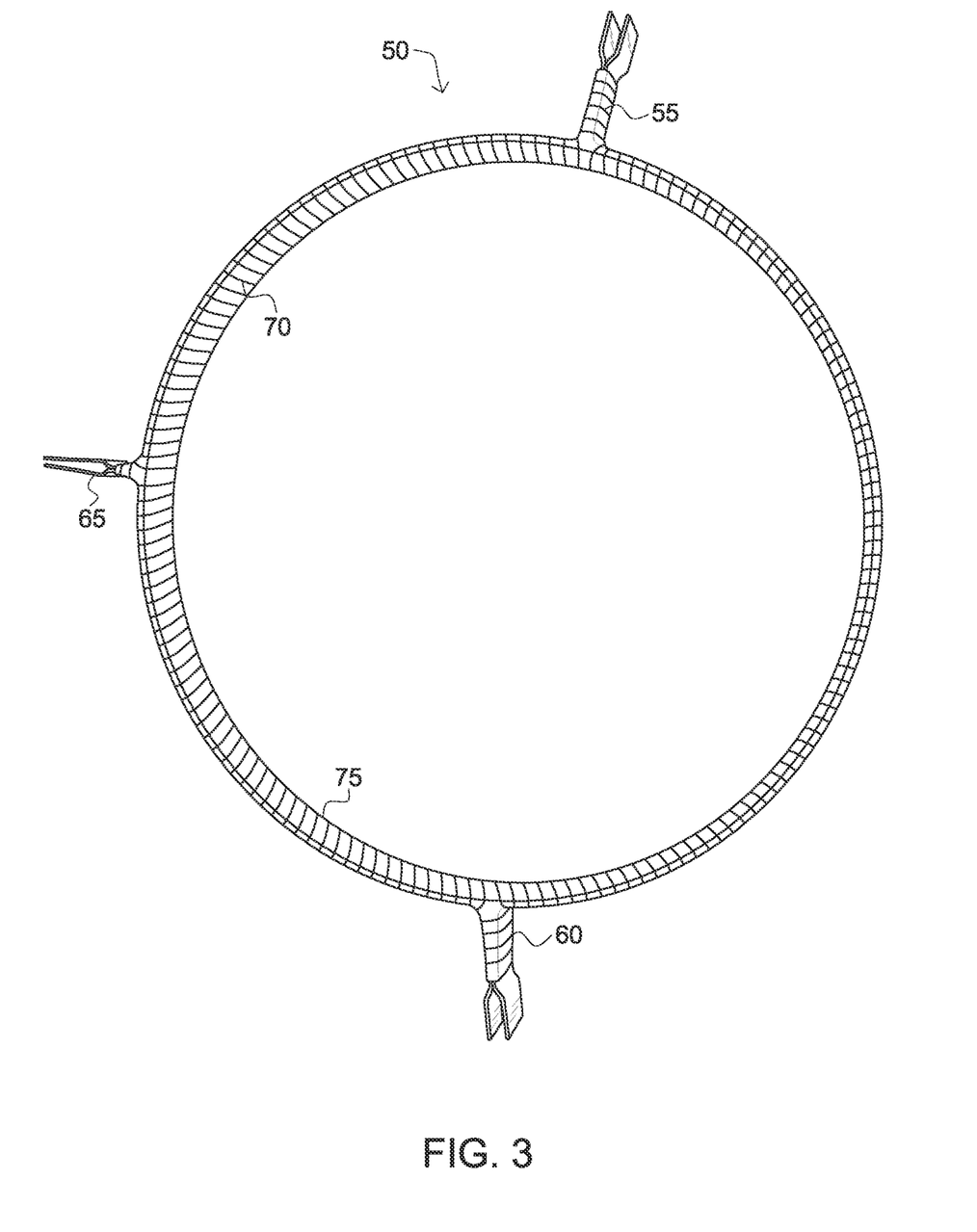
FIG. 3 is a perspective illustration of a typical prior art Wye-ring as is used in the generator of FIG. 2.

FIG. 3 is an illustration of a typical Wye ring 50 as is employed in General Electric (GE) Vietnam-type generators. As can be appreciated the specific configuration of the Wye-ring can vary significantly and substantially for generators produced by other manufacturers and for other models of GE generators. The illustrated Wye-ring 50 has an outside diameter of about 17.3125", a width of about 1" and a thickness of about 0.625". The entire surface of the Wye-ring excepting the cupped ends of the arms are typically wrapped in an insulating material such as a resin saturated fiberglass cloth 70.

Three cup arms 55, 60 & 65 extend radially outwardly from the ring portion 75 from three different locations that are not evenly spaced around the circumference of the ring portion. As shown, a left cup arm is spaced 98 degrees from a middle cup arm and a right cup arm is spaced 102 degrees from the middle cup arm. Accordingly, the left and right cup arms are spaced 160 degrees apart Each of the cup arms is about 2.80" in overall length; however as can been seen the forked portion of the middle cup arm differs from that of the left and right cup arms; wherein the length of the tined portion of the middle cup arm is about 1.80" long and the tined portions of the other cup arms are about 0.875" long.

The cup arms of the Wye ring are secured to the coil of the generator to provide a floating ground. Blocking 57a&b comprising radial and circumferential strips are provided between the coil and the smaller diameter Wye-ring to isolate and insulate the ring from the coil except in the desire attachment locations.

Embodiments of Replacement Wye Rings

Several embodiments of replacement Wye-ring systems are disclosed and described herein Each comprises three arcuate sections that when installed on a generator replace a faulty Wye-ring 50 that has been previously removed. The design of each of the replacement Wye-ring systems permits the replacement of the old ring without the necessity to remove the generator 40 from its location at the top of a wind turbine tower 20 within a nacelle 15. Ultimately, the ability to perform the replacement operation in situ eliminates the cost of removing the generator from the tower either by use of a tall crane or a helicopter along with the subsequent replacement of the generator. Additionally, because a crane or helicopter along with skilled operators do not need to be located and scheduled, a turbines down time as a result of a faulty Wye-ring can be significantly reduced. Because embodiments of the replacement Wye-ring comprises three pieces instead of a single ring, the stresses induced in the replacement Wye-ring because of thermal cycling and rotational forces are less than those of a unitary ring potentially increasing the service life of the replacement ring.

Figure 4A:
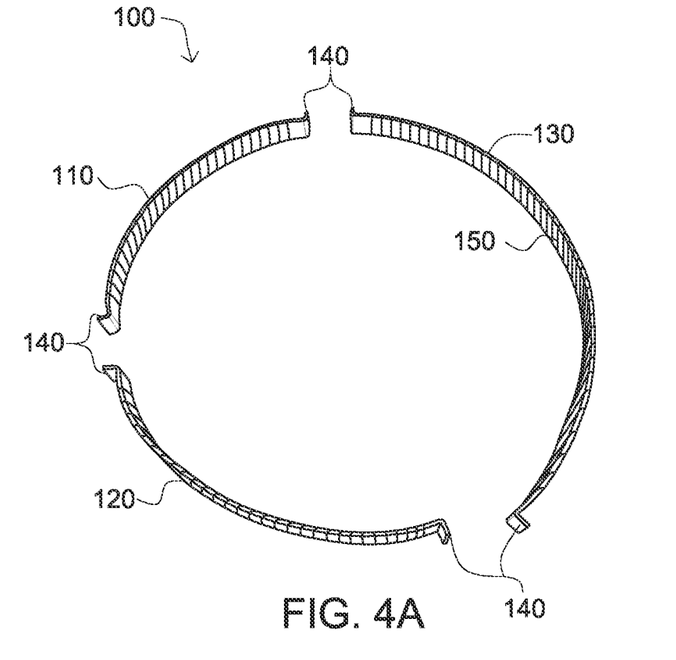
FIG. 4a-c each comprise perspective views of replacement Wye-ring systems in three sections according to embodiments of the present invention.

FIG. 4A illustrates an embodiment comprising a first set 100 of Wye-ring replacement sections. Simply, each section 100, 110 & 130 comprises conductive metallic ribbon that had been formed into an arcuate shape with a diameter (or radius) substantially similar to the diameter (or radius) of the Wye-ring it is replacing. For instance in one embodiment the arcuate sections have an effective diameter of 17.1875" The arc length of each section depends on the similar arc length between the cup arms of the Wye ring 10 that is being replaced. As typical with many Wye-rings the cup arms 55, 60 & 65 are not uniformly distributed at 120 degree intervals. See FIG. 3. In one embodiment replacement Wye-ring set, the first arcuate section 110 forms an arc of 98 degrees, the second arcuate section 120 forms an arc of 102 degrees, and the third section 130 forms an arc of 160 degrees.

The ribbon can comprise any suitable metal or other suitable conductive material but typically copper is utilized for its high electrical conductivity. Additionally, the size and shape of the ribbon can vary but in one embodiment a ribbon with a rectangular cross section having a thickness of 0.125" and a width of one inch is used. The ends of each arcuate section are bent radially outwardly to form short arms (or legs) 140. As is described in greater detail below, the arms provide a surface to which the arcuate sections can be joined to the Wye-ring cup arms 55-65, which when using this embodiment are left in place while the whole ring portion 75 of the faulty Wye-ring 50 is removed. The length of the end arms can vary but about 0.375" from the outer surface of the arcuate portion is typical.

As shown, most of the surface of the replacement ring sections 110-130, excepting the ends and the end arms are wrapped or otherwise covered in an insulating material 150. In one variation the insulating material comprises an epoxy impregnated fiberglass ribbon.

Figure 4B:
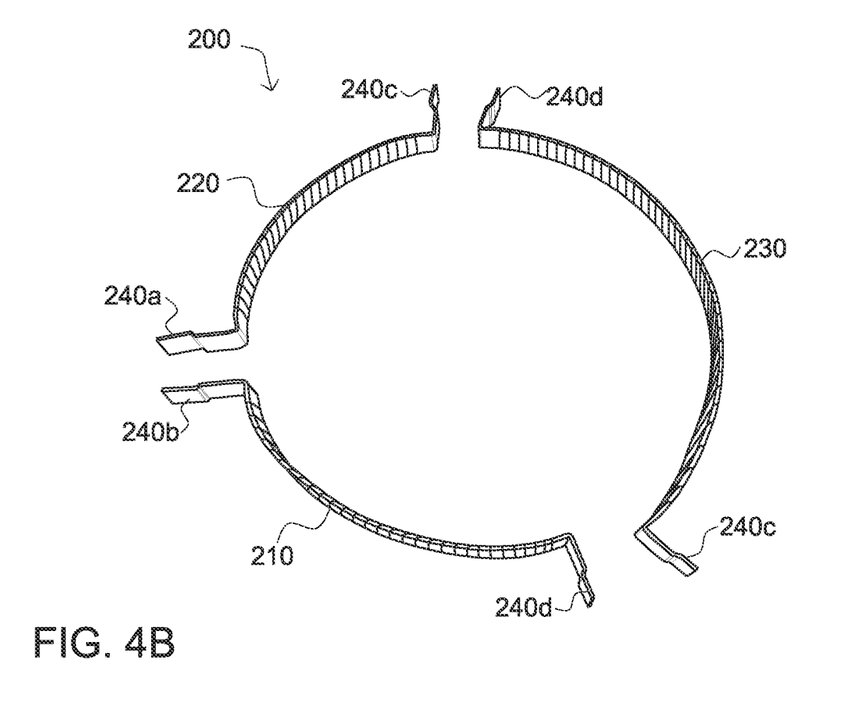

FIG. 4B illustrates an embodiment 200 comprising sections 210, 220 & 230 that are largely similar to the sections of the embodiment of FIG. 4A except for the configuration of the radially extending end arms 240a-d. Specifically, this embodiment is configured for use wherein the entirety of the faulty Wye-ring has been removed including the cupped ends 55-65. Consequently, each end arm comprises one half of a Wye-ring connector cup arm having one of the cup arm's two tines.

As is evident in FIG. 3, a Wye-ring 50 can comprise two end arms 55&60 of tines of one type can a third end arm 65 with tines of another type. As to be expected, two sections 210& 220 of the Wye-ring replacement combination will have end arms different from the other four so that when they are joined the other type of cup arm will result. As can be appreciated, the end arms of other variations and embodiments can vary depending on the particular configuration of the Wye-ring cup arms they are replacing.

In the one embodiment, the end arms 240a-d are about 2.80" long and include a jog to provide for the ultimate separation of the left and right tines that form a cup upon assembly, typically by brazing or welding, and installation thereof. The jog is typically located one to two inches above the end arm's intersection with its respective arcuate portion of the respective section.

Figure 4C:
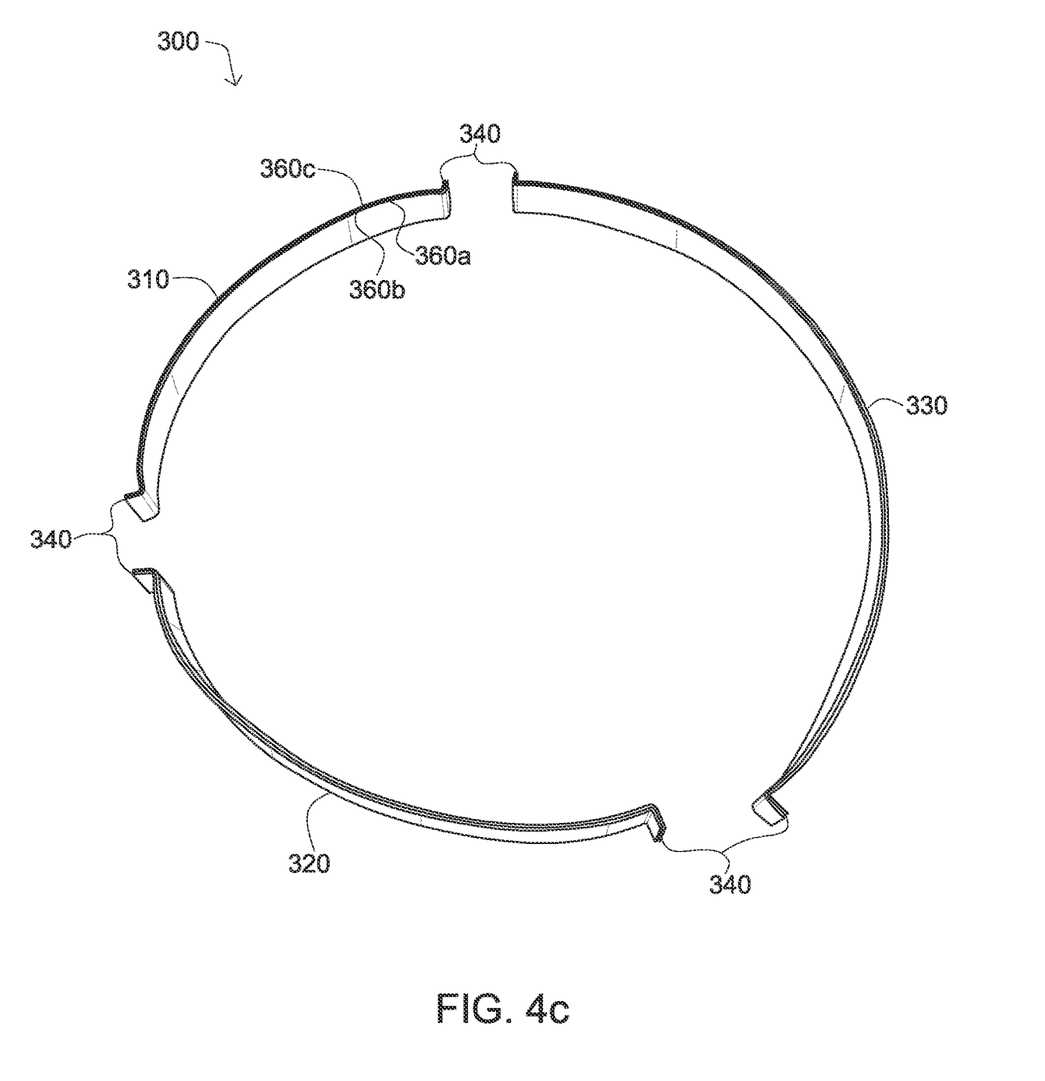

FIG. 4C comprises an embodiment 300 conceptually similar to the embodiment of FIG. 4A except instead of comprising a single thick ribbon each section 310, 320 & 330 each comprises a plurality of thinner ribbons 360a-c. The ends are formed and brazed or welded to form the end arms 340. In embodiments comprising three ribbons, the ribbons can be about one inch wide and 0.040" thick. The ribbons are typically made of a high conductive material, such as copper. Although not shown, a similar multi-ribbon variation comprising the longer cup forming arms of the embodiment of FIG. 4B are also contemplated.

The multi-ribbon variation permits the failure of one or two of the ribbons in a section 310-330 while still maintaining operational capacity. Presumably operational diagnostics will identify the failure of a ribbon of an arcuate section; however, rather than indicate an immediate need to shut down and order a repair, the condition can trigger notice that replacement of the Wye-ring assembly should be undertaken in the near future. The facility running the wind turbine will potentially have the ability to plan the shut down for minimal negative impact.

Embodiments of a Method for Replacing Wye Rings Using the Replacement Wye Rings

Figure 5A:
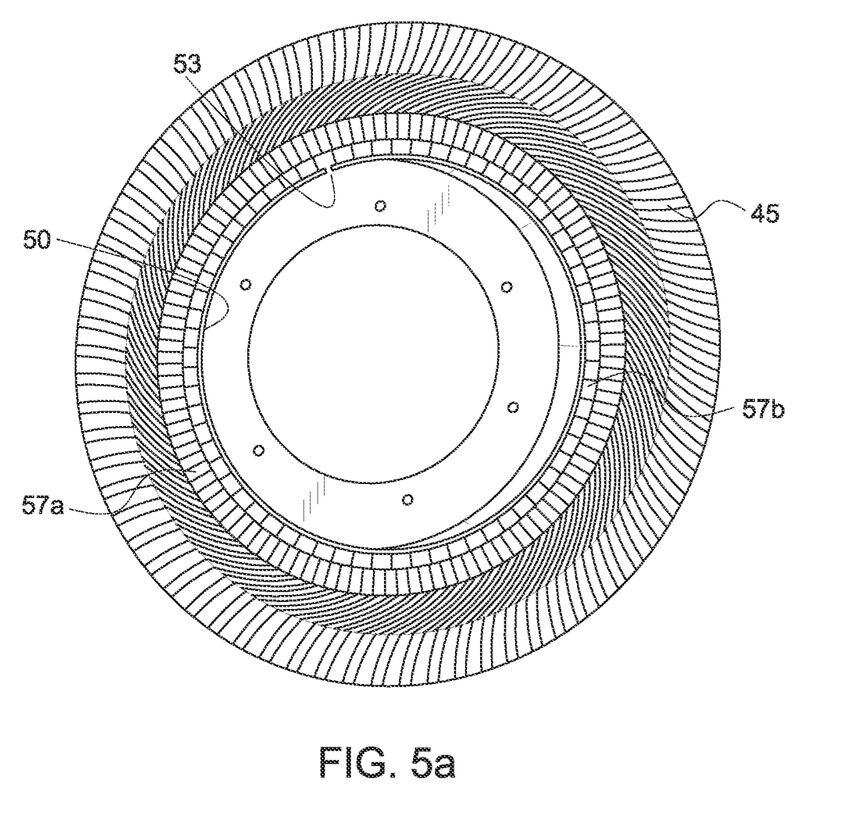
FIGS. 5a-c each illustrate different steps of the process of replacing a Wye-ring on a generator typically after the original Wye-ring has failed with the Wye-ring system of FIG. 4a according to embodiments of the present invention. For sake of clarity certain parts of the generator have been omitted from the figures for clarity.

As an initial step the site of the repair is prepared. Typically, the gear box is separated from the generator 40 within the nacelle housing 15 of the wind turbine 10. The end of the generator is dismantled to gain access to the Wye-ring 50. The location of the fault or failure is determined. If the fault is hound to exist in the ringed portion of the Wye-ring and the three cupped arms 55-65 are found to be intact and in proper working configuration, an embodiment of the replacement Wye-ring as illustrated in FIG. 4A or 4C can be used. If the fault exists in one or more of the Wye ring arms or if the arms do not appear to be in good condition, an embodiment such as illustrated in FIG. 4B can be used. FIG. 5A illustrates a section of the Wye-ring having a fault in the form of a crack 53 in the ring.

Figure 5B:
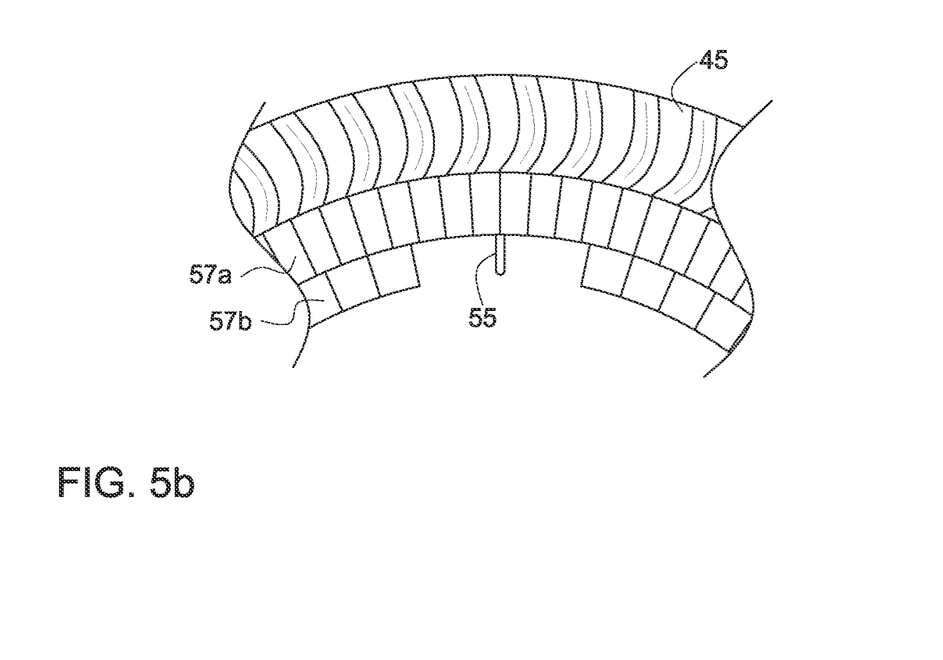
Figure 6A:
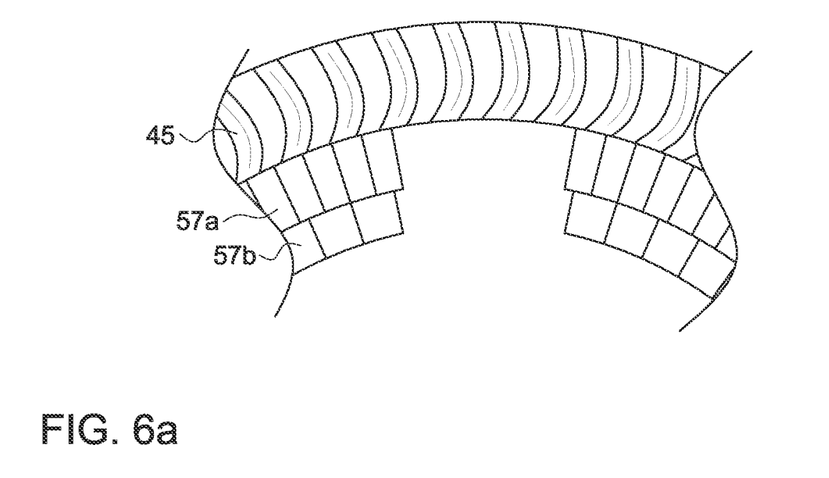
FIGS. 6a&b each illustrate different steps of the process of replacing a Wye-ring on a generator typically after the original Wye-ring has failed with the Wye-ring system of FIG. 4b according to embodiments of the present invention. For sake of clarity certain parts of the generator have been omitted from the figures for clarity.

Next, the Wye-ring is removed. Typically, this requires cutting the ringed portion into section and removing each section from the end of the generator. Where the Wye-ring cupped arms are to be reused, the ringed portion 75 of the ring is cut free of the arms near the arms intersection with the ringed portion leaving a generally flat surfaces on either side of the base of the cupped arms 55-65 to which the end arms 140 of the replacement sections can be secured. If the cupped arms are not to be reused they are removed as well. Of note, gaining access to the generally flat surfaces at the base of each arm or removing the arms altogether will often require the removal of insulating blocking 57a&b in the vicinity of the arms.

Where a replacement ring system 100 as shown in the embodiment of FIG. 4A is utilized, the flat surfaces of each cupped arm's base are cleaned, such as with the use of an abrasive cloth or paper Flux may also be applied to the surfaces to facilitate deoxidization. FIG. 5B shows a cupped arm 55 prepped and ready to have sections of the replacement Wye-ring secured to it.

Where a replacement ring system 200 as shown in the embodiment of FIG. 4B is utilized, The blocking 57a&b in the vicinity of the cup is removed and the connection points of the Wye-ring's cupped end arms to the coil 45 are cleaned and prepped to receive the replacement Wye-ring sections 210-230 FIG. 6a illustrates an area of the generator 40 wherein the cupped arm of the removed Wye-ring and surrounding blocking has been removed in anticipation of receiving the cup forming end arms 240a-d of the replacement Wye-ring sections.

Figure 5C:
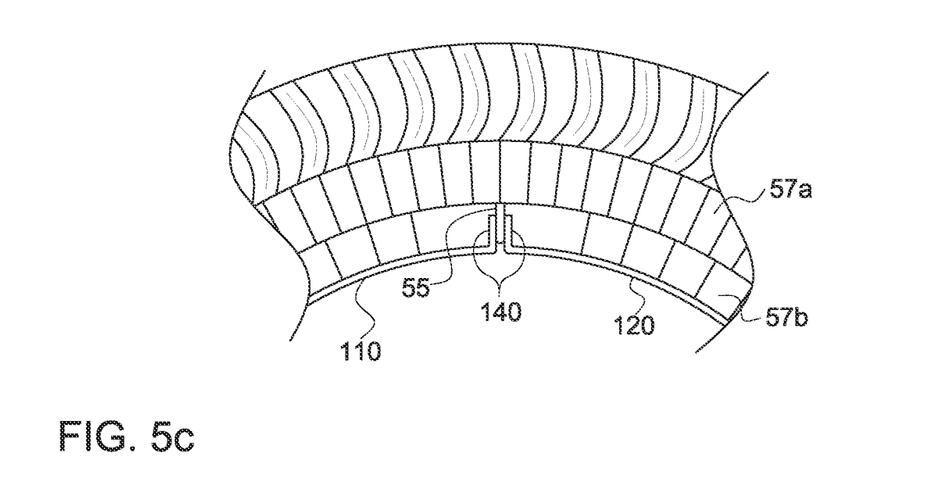
Figure 6B:
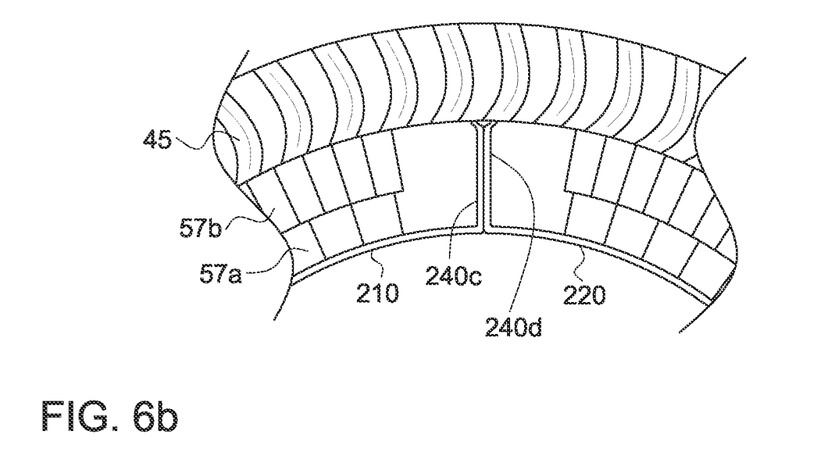

Next, as shown in FIG. 5C, the replacement Wye-ring sections 110& 120 of FIG. 4A are one of welded or brazed in place to the flat surfaces of the cupped arm 55. Wherein the replacement Wye-ring sections 200 of FIG. 4B are utilized, each end arm 240c&d of the replacement sections 310-320 is secured to the coil 45 and adjacent sections are either welded or brazed together to form a cupped end as illustrated in FIG. 6B.

Once all the sections of the replacement Wye-ring system 200, 300 or 400 have been installed, the exposed sections of the ring, typically proximate the location wherein the ring has been secured to the generator or cupped arms of the old Wye-ring, is insulated. The insulation can include wrapping the exposed metal portions with a mica mylar tape and then wrapping the mylar tape with a fiber glass fabric ribbon that has been dipped in epoxy. New blocking to replace the old blocking is also installed. The blocking is typically tied and epoxy bonded in place. Once the epoxy has cured the generator can be reassembled and the gear box can be reconnected thereto.

As mentioned previously, the entire process of replacing a faulty Wye-ring can be accomplished in situ without having to remove the generator from the nacelle and the tower. This can dramatically reduce downtime and the cost of the repair. Importantly, the same process can also be performed on generators that have been removed from the tower.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of replacing a Wye-ring of a generator with a replacement Wye-ring, the method comprising:
providing the replacement Wye-ring, the replacement Wye-ring comprising in combination, (1) a first arcuate section having an effective radius comprised of one or more strips electrically conductive ribbon, the first arcuate section including first and second ends, (2) a second arcuate section, having the effective radius comprised of one or more strips electrically conductive ribbon, the second arcuate section including, third and fourth ends, and (3) a third arcuate section having the effective radius comprised of one or more strips electrically conductive ribbon, the third arcuate section including fifth and sixth ends;
dismantling the generator to gain access to the Wye ring with the generator being located in situ within the wind turbine;
with the generator being located in situ within the wind turbine, removing most of the annular ring of the Wye-ring but leaving most to substantially all of three radially extending cups in place;
with the generator being located in situ within the wind turbine, installing the replacement Wye ring in the generator including attaching each of the first, second, third, fourth, fifth and sixth ends to one of the three radially extending cups; and
reassembling the generator with the generator being located in situ within the wind turbine in situ within the wind turbine.

2. The method of claim 1, wherein said removing the annular ring comprises cutting the Wye ring at the base of each of the three radially extending cups proximate where each cup intersects the annular ring.

3. The method of claim 1, wherein said attaching each of the first, second, third, fourth, fifth and sixth ends comprises brazing each of the first, second, third, fourth, fifth and sixth ends to one of the three radially extending cups.

4. The method of claim 1, wherein said attaching each of the first, second, third, fourth, fifth and sixth ends comprises welding each of the first, second, third, fourth, fifth and sixth ends to one of the three radially extending cups.

5. The method of claim 1, wherein said dismantling the generator includes removing blocking located between the Wye-ring and generator coils in regions proximate the location of each of the three radially extending cups.

6. The method of claim 5, further comprising after said installing the replacement Wye ring in the generator:
insulating the first, second and third arcuate sections in proximity to their connection to the respective radially extending cups;
installing and securing replacement blocking.

7. The method of claim 6, wherein said insulating comprises wrapping the first second and third arcuate sections with a non-woven felt and impregnating the felt with epoxy, and wherein said installing and securing comprises applying epoxy to the replacement blocking.

8. A method of replacing a Wye-ring of a generator with a replacement Wye-ring, the method comprising:
providing the replacement Wye-ring comprising in combination
(1) a first arcuate section having an effective radius comprised of one or more strips electrically conductive ribbon, the first arcuate section including first and second ends with the respective ends including a radially outwardly extending first and second radial arms,
(2) a second arcuate section, having the effective radius comprised of one or more strips electrically conductive ribbon, the second arcuate section including third and fourth ends with the respective ends including a radially outwardly extending third and fourth radial arms, and
(3) a third arcuate section having the effective radius comprised of one or more strips electrically conductive ribbon, the third arcuate section including fifth and sixth ends with the respective ends including a radially outwardly extending fifth and sixth radial arms,
wherein the first, second, third, fourth, fifth and sixth radial arms each extend about 2.80";
dismantling the generator to gain access to the Wye ring;
substantially removing the Wye-ring;
both attaching each of the first, second, third, fourth, fifth and sixth radial arms to a coil of the generator; and
reassembling the generator.

9. The method of claim 8, wherein said dismantling, said substantially removing, said both attaching and said reassembling is performed with the generator located in situ within the wind turbine.

10. The method of claim 8 wherein said attaching each of the first, second, third, fourth, fifth and sixth radial arms to a coil of the generator comprises brazing adjacent arms of the first, second, third, fourth, fifth and sixth radial arms together.

11. The method of claim 8 wherein said attaching each of the first, second, third, fourth, fifth and sixth radial arms to a coil of the generator comprises welding adjacent arms of the first, second, third, fourth, fifth and sixth radial arms together.

12. A method of replacing a Wye-ring of a generator with a replacement Wye-ring, the method comprising:
providing the replacement Wye-ring, the replacement Wye-ring being comprised of copper;
with the generator being located in situ within the wind turbine, dismantling the generator to gain access to the Wye-ring;
with the generator being located in situ within the wind turbine, removing most of the annular ring of the Wye-ring;

with the generator being located in situ within the wind turbine, installing the replacement Wye ring in the generator by one or both of brazing or welding the replacement Wye-ring in the generator; and with the generator being located in situ within the wind turbine in situ within the wind turbine, reassembling the generator.

13. The method of claim 12, wherein (1) said removing most of the Wye-ring includes leaving most to substantially all of a plurality of radially extending cups of the Wye-ring in the generator, and (2) said installing the replacement Wye ring in the generator by one or both of brazing or welding the replacement Wye-ring in the generator includes welding or brazing the replacement Wye-ring to the plurality of radially extending cups.

14. The method of claim 12, wherein the replacement Wye-ring further includes a plurality of radially-extending arms, and wherein said installing the replacement Wye ring in the generator by one or both of brazing or welding the replacement Wye-ring in the generator comprises attaching each of the plurality of radially extending arms to a coil of the generator.

15. The method of claim 12, wherein the replacement Wye-ring comprises three arcuate sections with each arcuate section having opposing ends.

* * * * *